US008191782B2

(12) United States Patent  (10) Patent No.: US 8,191,782 B2
Blythe  (45) Date of Patent: Jun. 5, 2012

(54) SWIPE CARD AND A METHOD AND SYSTEM OF MONITORING USAGE OF A SWIPE CARD

(75) Inventor: Simon Blythe, Cambridgeshire (GB)

(73) Assignee: MasterCard International, Inc., Purchase, NY (US)

( * ) Notice: Subject to any disclaimer, the term of this patent is extended or adjusted under 35 U.S.C. 154(b) by 611 days.

(21) Appl. No.: 12/332,841

(22) Filed: Dec. 11, 2008

(65) Prior Publication Data

US 2009/0145964 A1    Jun. 11, 2009

Related U.S. Application Data

(60) Provisional application No. 61/012,804, filed on Dec. 11, 2007.

(51) Int. Cl.
*G06K 7/06* (2006.01)
(52) U.S. Cl. .................................... 235/449; 235/451
(58) Field of Classification Search .................. 235/449, 235/451, 453, 493
See application file for complete search history.

(56) References Cited

U.S. PATENT DOCUMENTS

| | | | |
|---|---|---|---|
| 5,907,149 A | 5/1999 | Marckini | |
| 2004/0225776 A1 | 11/2004 | DiRaimondo et al. | |
| 2006/0192006 A1* | 8/2006 | Brown | 235/449 |
| 2007/0152052 A1* | 7/2007 | Sines | 235/449 |
| 2008/0135630 A1* | 6/2008 | Cooper | 235/492 |
| 2008/0217399 A1 | 9/2008 | Leblanc | |
| 2008/0308627 A1* | 12/2008 | Sines et al. | 235/380 |
| 2009/0298540 A1* | 12/2009 | Narendra et al. | 455/557 |

\* cited by examiner

*Primary Examiner* — Ahshik Kim
(74) *Attorney, Agent, or Firm* — Hoffmann & Baron, LLP

(57) ABSTRACT

A swipe card and a method and system of monitoring usage of a swipe card. The swipe card includes a substrate forming a body of the card, a magnetic strip for storing accessible account information and a swipe counter. The swipe counter detecting and accessibly storing a count of the number of times the magnetic strip is swiped. The swipe counter can include a piezo-electric element. The swipe counter can include a capacitive element for storing pulses of energy generated when the magnetic strip is swiped. The swipe counter can include a micro-electromechanical system for recording select physical movement of the card. The swipe card can further include a swipe analyzer for detecting and accessibly storing descriptive information associated with at least one transaction associated with each swipe, wherein the swipe analyzer is operatively coupled to the magnetic strip.

18 Claims, 3 Drawing Sheets

SWIPE CARD AND A METHOD AND SYSTEM OF MONITORING USAGE OF A SWIPE CARD

CROSS-REFERENCE TO RELATED APPLICATIONS

This application claims the benefit of U.S. Provisional Patent Application Ser. No. 61/012,804 filed on Dec. 11, 2007.

BACKGROUND

1. Field of the Invention

The present invention generally relates to a method and system of monitoring the usage of a swipe card, such as those used in financial transactions. More particularly, the invention relates to monitoring the swipes of the magnetic strip or embedded chip included in credit cards, debit cards, identification cards and the like.

2. Brief Description of the Related Art

Contemporary credit, debit, identification, pass-key and even cash cards use magnetic strips that maintain encoded information for authenticating and identifying the user of a card. In addition to a traditional magnetic strip that holds information, often these cards further contain an embedded integrated circuit, which can process information. A card including such an integrated circuit is often referred to as a smart card, chip card or integrated circuit card (ICC). These ICC's include an embedded integrated circuit that can process information. This implies that the ICC can receive input which is processed—by way of ICC applications—and delivered as an output.

While contemporary swipe cards can accessibly store account and/or identification information, they are incapable of providing a count of the number of times the card has been swiped. It being understood that a swipe of a swipe card generally involves passing the card near or through an electronic device which reads magnetically encoded information thereon. Thus, it is desirable to provide a swipe card capable of registering and accessibly storing a swipe count. Also, it is desirable to provide a method and system of monitoring usage of a swipe card by using a swipe count from a swipe card.

SUMMARY

One aspect of the present invention relates to a swipe card including a substrate, a magnetic strip and a swipe counter. The substrate forms a body of the card. The magnetic strip is for accessibly storing valuable information, such as account information and/or other information. The magnetic strip being secured to the substrate. The swipe counter detecting and accessibly storing a count of the number of times the magnetic strip is swiped, wherein the swipe counter is operatively coupled to the magnetic strip. The swipe count being distinct from a number of authorized transactional uses of the card.

Additionally, the swipe counter can include at least one of a piezo-electric element, a capacitive element for storing pulses of energy generated when the magnetic strip is swiped and a micro-electromechanical system for recording select physical movement of the card. Further, the swipe card can include a swipe analyzer for detecting and accessibly storing descriptive transaction information and/or the nature of at least one transaction associated with each swipe. The swipe analyzer being operatively coupled to the magnetic strip. The swipe counter can include a sensor for detecting at least one of heat, light or vibration associated with the swiping of the card.

Another aspect of the present invention relates to a method of monitoring usage of a swipe card. The method including receiving and correlating a swipe count. The method also including initiating swipe mismatch management. The swipe count indicating a number of times the card has been swiped by a magnetic reader. The correlation using the swipe count in addition to a transaction record associated with the swipe card. Also, swipe mismatch management being initiated upon the swipe count not matching at least one threshold value relative to the transaction record.

Additionally, the at least one threshold value can be a range of values associated with a number of transactions indicated by the transaction record. Also, the at least one threshold value can be calculated by at least one of adding and subtracting a predetermined value to a number of transactions based on the transaction record. Further, the method can include receiving swipe descriptive information associated with at least one transactional use of said card. The swipe descriptive information can identify information associated with the at least one transactional use of the card that is distinct from a swipe count.

Yet another aspect of the invention relates to a system for monitoring swipes of a swipe card. The system includes a swipe card, a swipe terminal, a host and a network for communicating information, such as a swipe count, between the swipe terminal and the host. The swipe card including a swipe counter for accessibly storing a swipe count, wherein the swipe count indicates the number of times the card has been swiped. The swipe terminal capable of reading and transmitting the swipe count. Also, the host having access to account transaction records for correlation to the swipe count.

Several benefits can be derived from the present invention, such as fraud prevention and identifying problems with swipe card usage whether by the card holder or a merchant with which the card holder transacts.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION

The invention includes a financial transaction device in the form of a magnetic swipe card. Preferably, the swipe card includes a magnetic strip and a sensor that includes a detection system for recognizing and storing a count of how often the card has been swiped. Preferably, the swipe count can be read, registered and/or accessed from the card and correlated to verified transactional uses and/or transaction records for that card in order to monitor and verify authorized usage of the card. Such monitoring can be used as part of a fraud prevention system.

A swipe card in accordance with the present invention maintains a record of when it has been swiped, which can be read in order to monitor usage of the card and reduce fraud. The swipe card preferably incorporates a sensor to detect whether and how often the card has been swiped. The sensor can be disposed in or near a magnetic strip or an integrated circuit (i.e., a chip) on or in the card. When the card is swiped during a recognized transaction (also referred to herein as "transactional usage"), the card in accordance with the present invention will reveal how often it has been swiped. A tally of the number of swipes is thus kept and reported by the card. This tally can then be compared to the number of verified and/or authorized swipe transactions as a fraud indicator. Additionally, certain swipe cards are capable of storing additional transaction information, such as the number and nature of swipes between financial transactions, which can be accessible to the card provider and/or the card's owner.

Figure 1A:
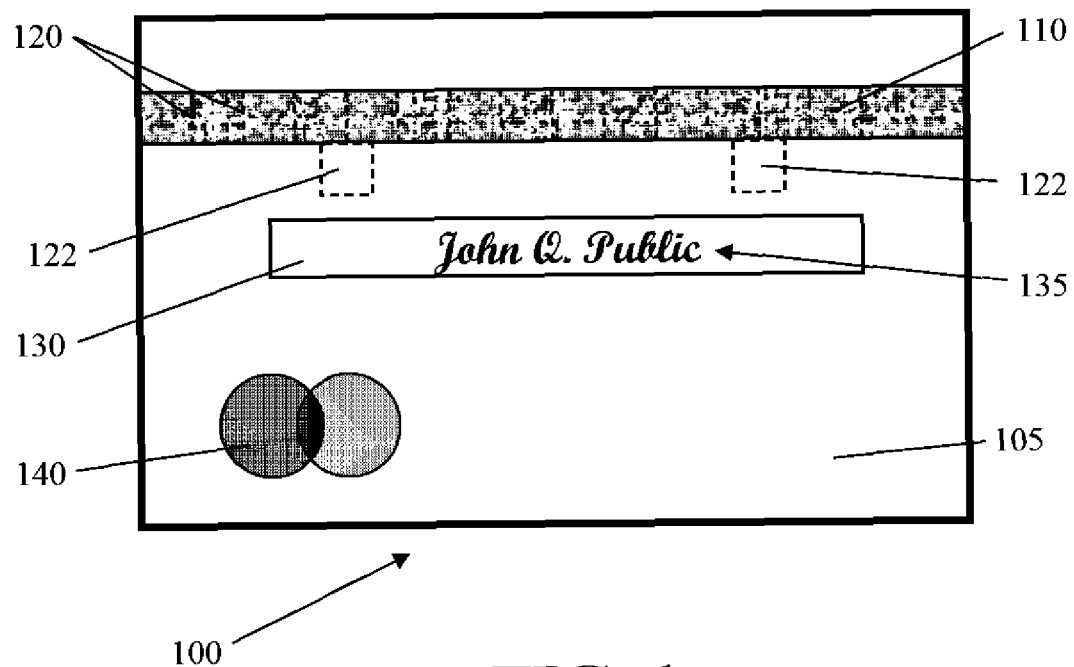
FIG. 1a is a plan view representation of a swipe card in accordance with the present invention.

FIG. 1a shows a swipe card 100 in accordance with the present invention. The card 100 is preferably used for financial transactions like a contemporary credit, debit or cash card or similar device. Alternatively, the card 100 can be used to verify a user's identity like a pass, admission, membership or access card. The card 100 is preferably formed from a primary base substrate 105, such as those used in contemporary credit cards. The substrate 105 carries a magnetic strip 110 that is secured thereto. The magnetic strip capable of storing information associated with the swipe card 100, including unique information relating to an individual swipe card 100.

The card 100 preferably includes at least one swipe counter 120 capable of detecting and accessibly storing a count of the number of times the magnetic strip is swiped. The swipe counter 120 preferably includes a sensor for detecting swipes and a storage element for maintaining a count of the swipes. Preferably, the sensor portion of the swipe counter 120 is disposed such that it can effectively detect swipes of the card 100. FIG. 1a shows a first embodiment of a swipe counter 120. The swipe counter 120, as shown in FIG. 1a, has one or more sensors disposed on or in the magnetic strip 110 (represented by vertical dotted lines). It should be understood that although multiple dotted lines 120 are shown evenly distribution across the magnetic strip 110, the card can have more sensors than shown or only a single sensor. Alternatively, a different number and configuration of swipe counters 120 and/or sensors can be used. Also, the memory and/or storage portion of the swipe counter 120 can be embedded within the magnetic strip 110 or elsewhere on the card 100, such as one or more areas 122. Preferably, the storage portion is operatively coupled to the sensor portion for receiving and accessing swipe count information.

Figure 1B:
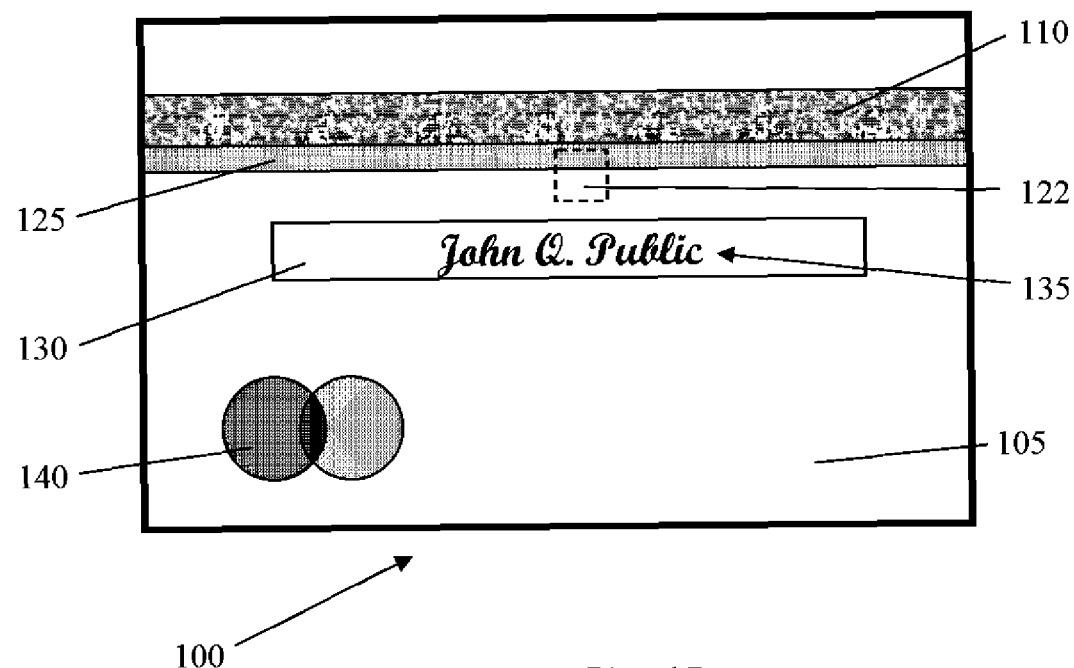
FIG. 1b is a plan view representation of an alternative swipe card in accordance with the present invention.

FIG. 1b shows an alternative embodiment of the swipe card 100, where the swipe counter 125 is shown as a strip disposed immediately adjacent to the magnetic strip 110. It should be understood that although swipe counter 125 is shown extending across the length of the card 100, alongside the magnetic strip 110, the swipe counter 125 can alternatively be disposed in only a small area of the card 100, such as area 122. As a further alternative, either version of the swipe counter 120, 125 or elements thereof can be incorporated into an integrated circuit, such as a computer chip, included on the card 100. Such an integrated circuit could be powered by various means, including nano-power technology. Additionally, other elements such as a swipe analyzer can be disposed in area 122 or incorporated into the counter 125. Such a swipe analyzer can preferably detect and/or accessibly store descriptive transaction information associated with at least one transactional usage of the card, wherein the swipe analyzer is operatively coupled to the magnetic strip 110.

In one embodiment of the invention, the swipe counter 120, 125 includes one or more piezo-electric and capacitive elements. The piezo-electric elements are capable of generating a characteristic pulse of energy as the card is moved across a magnetic strip reader. The pulse of energy generated is then preferably stored in the capacitive element. The capacitive element can be located in a separate part of the card 100, such as area 122. Such a capacitive element preferably does not require a continuous power source, such as a battery. Preferably, the design of the piezo-electric elements and their interconnection is optimized to reduce the number of false positives due, for example, to normal flexing of the card during transportation and handling. The number or level of charges stored in the capacitive element translates to a number of swipes of the card 100. In this way, as part of a subsequent financial transaction, the stored charge (which equates to a swipe count) is read and communicated to a host, which can then use the swipe count information. It should be understood that any transaction in which information is read from the card and communicated to a corresponding host computer is considered a financial transaction, whether or not a network is involved.

In another embodiment of the invention, the swipe counter 120, 125 includes a micro-electromechanical system (MEMS), which detects and counts card swipes. In this embodiment, the card 100 preferably need not carry a power source for storing the swipe count. The MEMS takes advantage of the mechanical flexure of the card during swiping. Thereafter, similar to the capacitive element described above, the MEMS elements can be interrogated during a financial transaction. Conceivably, the MEMS components could be incorporated into a smart-card chip for robustness and ease of interconnectivity.

In yet another embodiment of the invention, the card 100 includes at least one continuously powered integrated circuit, with a power source on the card. The integrated circuit and power source can be located on the card, such as in area 122. The power source can be a tiny battery on the card or an on-card device that derives power from the environment, such as solar, thermoelectric and/or magneto electric elements (i.e., using light, heat and/or vibrations to power the device).

In yet another embodiment of the invention, the swipe counter 120, 125 includes one or more magnetic sensors built into the stripe area 110. The magnetic sensors detect the pulse of magnetic flux resulting when a slightly magnetized metallic magnetic strip reader head passes over it. As above, the current or previous swipe count is immediately communicated to a host for use in fraud detection and management processes.

As yet a further alternative, the swipe counter 120, 125 can detect swipes using a microphone or vibration sensor that detects characteristic sounds and/or vibrations associated with swiping the card.

The card 100, as shown in FIGS. 1a and 1b, can also include features found on contemporary credit/debit cards, such as a signature strip 130 for receiving the user's signature 135. Also, other portions of the card 140 can be used for logos, pictures, holograms or other known features.

Figure 2:
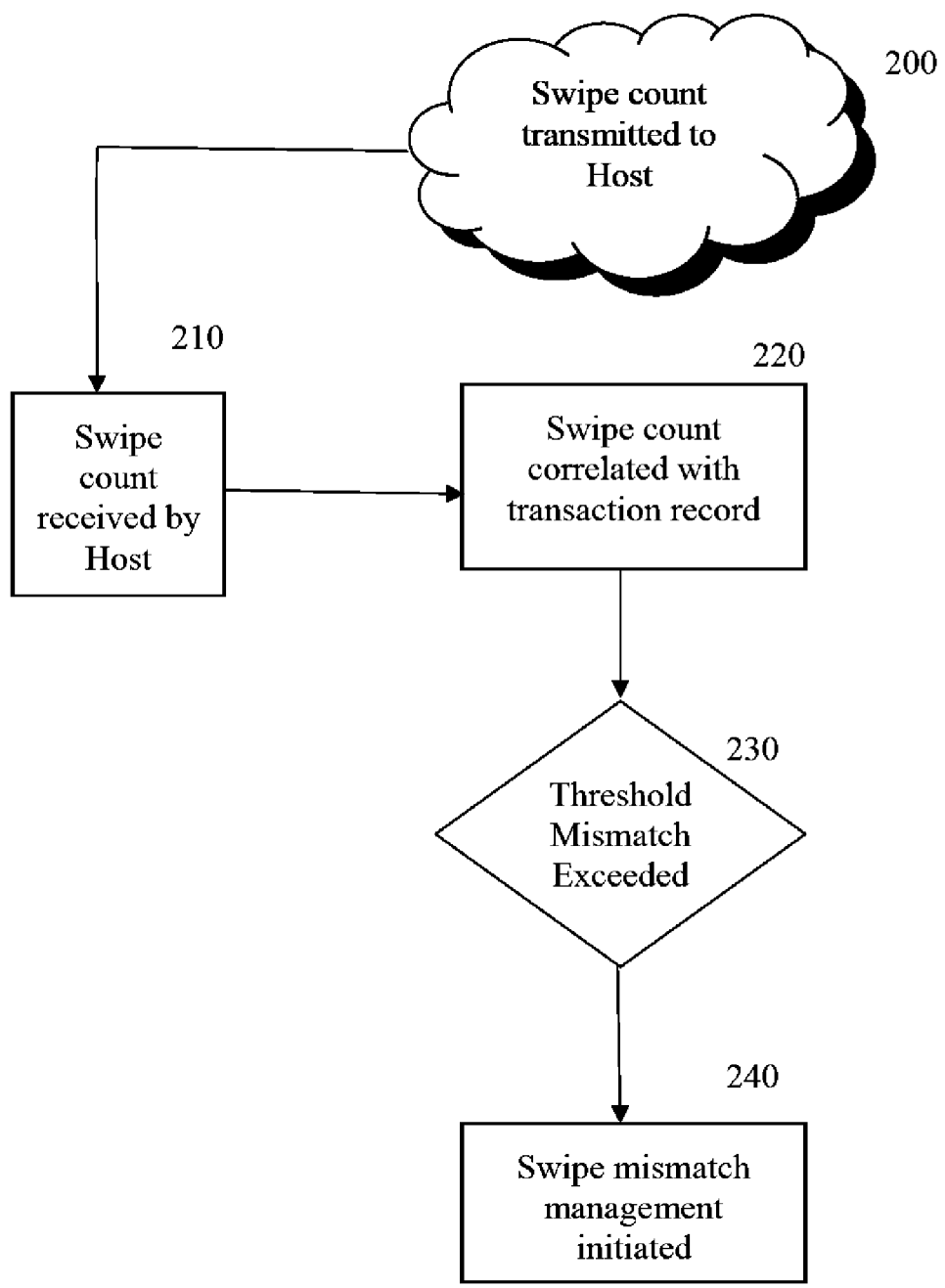
FIG. 2 is a flow chart representing a method of monitoring usage of a swipe card in accordance with one embodiment of the present invention.

FIG. 2 shows a flow chart of how a host, such as a payment processor or intermediary, can implement the method of the present invention. After the swipe count is transmitted to the host 200, preferably from a merchant facility, the swipe count is received by the host 210. Thereafter, the swipe count information is correlated to transaction records maintained by the host 220. Transaction records generally include information associated with the transactions for which the card is used. Thus, a traditional credit card transaction record can include a transaction date/time, a merchant name/location, an amount exchanged in the transaction and additional information detailing the goods and/or services associated with the transaction. Additionally, in accordance with the present invention, the transaction records preferably include an expected swipe count that corresponds to a number of authorized swipe transactions the host has on record for the subject card. A mismatch between the expected swipe count and the received swipe count can be considered an indication that the card has been used in an unauthorized or unapproved manner. It being understood that unauthorized or unapproved transactions relate to uses of a card that are undesirable or unfavorable to an account associated with the card. However, when the difference between the expected swipe count and the received swipe count is minor, a host may decide such a condition is expected, acceptable or does not warrant further investigation. Thus, in one preferred embodiment, the host establishes a threshold value that is compared to the difference between the expected swipe count and the received swipe count before that host considers a mismatch significant. If the threshold mismatch value is exceeded 230, the host preferably initiates swipe mismatch management 240. One aspect of swipe mismatch management 240 can include the implementation of procedures for customized handling of an account. Such procedures can include transmitting warning to card holders, merchants or other entities regarding the account. Additionally, mismatch management 240 can include disabling or placing restrictions on the card. Such restrictions can include requiring added authentication before validating transactions. Also, if applicable, the card can be restricted to chip card transactions only. The full extent of services provided by swipe mismatch management 240 is preferably implemented by the host, but card holders and merchants can also be involved.

The swipe count mismatch or exceeded threshold mismatch value can also be used to monitor swipe card activity by the card holder or particular merchants. For example, an indication of a swipe count mismatch can indicate a problem with the swipe card or a problem in the way the card holder is using or maintaining the card. Often such problems can deter a cardholder from using his or her card. Alternatively, by using additional transaction record information (such as merchant name or number), a host can match transaction records from multiple accounts to one or more merchants. Such information is also referred to herein as descriptive transaction information. In this way, repeated swipe count mismatches or exceeded threshold values correlated to one or more merchants can indicate a problem. Such merchant problems could include faulty equipment or merchant/employee fraud or misuse of equipment, which potentially warrants special handling.

Figure 3:
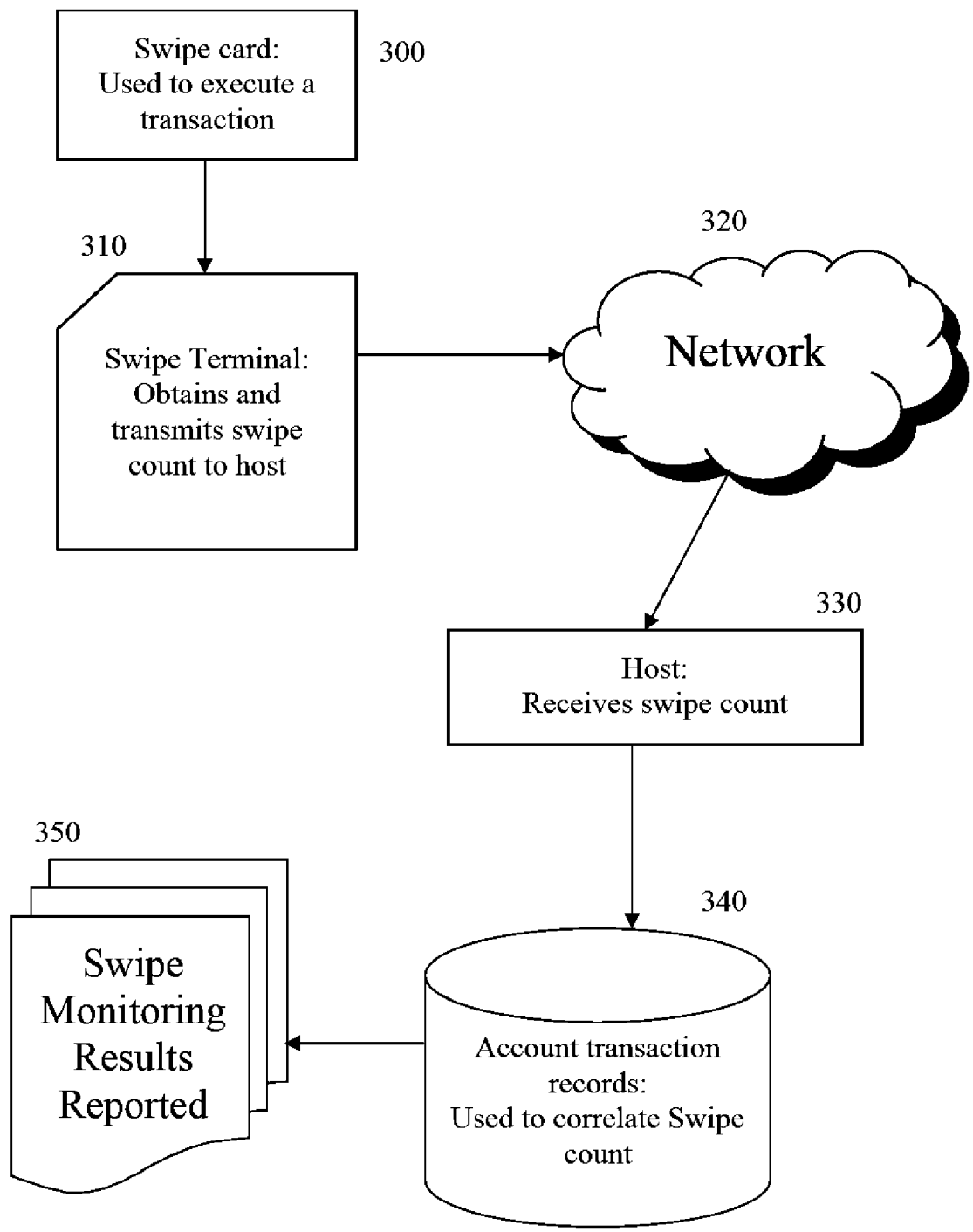
FIG. 3 is a schematic representation a system for monitoring usage of a swipe card in accordance with the present invention.

As illustrated in FIG. 3, the swipe card of the present invention is used as part of a system of elements, which when used together monitor usage of the card. The swipe card of the present invention is preferably used to execute a transaction 300, by swiping the card at a merchant facility. The card is usually swiped through a reader device such as a magnetic or integrated circuit reader. The reader device preferably obtains the information contained on the card and transmits that information to a host 310. Preferably, when the card is swiped, in addition to reading the account and/or identification information stored on the card, a swipe count is also read. Thereafter, the account/identification information along with the swipe count are transmitted to the host 310. This transmission can be conducted over almost any network 320, although appropriate security measures (such as encryptions) should be taken when using non-secure networks. Such networks include traditional telecommunications networks, personal or private area networks or other means available to communicate information. The host then receives the swipe count 330 and related information from the network 320. The host preferably has access to its customers' account records. Thus, after receiving the swipe count 330, the host can correlate the swipe count information to its account transaction records 340. Thereafter, if the correlation results in a threshold mismatch, a swipe monitoring report can be generated 350 that may be used in problem determination.

It is understood that the systems, functions, methods, steps and calculations described herein can be implemented in hardware, software, or a combination of hardware and software. They may be implemented by any type of computer system, processor or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

Aspects of the present invention can also be embedded in a computer program product or computer-readable storage medium, which comprises all the features enabling the implementation of the methods and functions described herein, and which—when loaded in a computer system or processor—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. The term computer readable storage medium is any data storage device that can store data, which can thereafter be read by a computer system or processor. Examples of the computer readable storage medium include read-only memory, random-access memory, CD-ROMs, DVDs, magnetic tape, optical data storage devices, and carrier waves. The computer readable storage medium can also be distributed over network-coupled processors or computer systems so that the computer readable code is stored and executed in a distributed fashion.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention. It will be understood that various modifications may be made without departing from the spirit and scope of the invention. For example, dedicated servers or virtual servers, collectively remote servers, may operate as hosts and be organized or contained in various ways, and reside on multiple computers. Also, the steps described above may be modified in various ways or performed in a different order than described above, where appropriate. Accordingly, alternative embodiments are within the scope of the following claims.

What is claimed is:

1. A swipe card for authorizing transactional uses thereof, the swipe card comprising:
   a substrate forming a body of the card;
   a magnetic strip for storing accessible account information, the magnetic strip secured to the substrate;
   a swipe counter for detecting and accessibly storing a swipe count of the number of times the magnetic strip is swiped, wherein the swipe count is distinct from a number of authorized transactional uses of the card, also wherein the swipe counter is operatively coupled to the magnetic strip; and
   a swipe analyzer for detecting and accessibly storing descriptive transaction information associated with at least one transactional usage of the card, the descriptive transaction information including a merchant identifier, wherein the swipe analyzer is operatively coupled to the magnetic strip.

2. The swipe card of claim 1, wherein the swipe counter includes a piezo-electric element.

3. The swipe card of claim 1, wherein the swipe counter includes a capacitive element for storing pulses of energy generated when the magnetic strip is swiped.

4. The swipe card of claim 1, wherein the swipe counter includes a micro-electromechanical system for recording select physical movement of the card.

5. The swipe card of claim 1, wherein the swipe counter includes a sensor for detecting at least one of heat, light or vibration associated with the swiping of the magnetic strip.

6. A method of monitoring usage of a swipe card, the method comprising:
   receiving a swipe count from the swipe card, wherein the swipe count indicates a number of times the card has been swiped by a magnetic reader, the swipe count being distinct from a number of authorized transactional uses of the card;
   correlating the swipe count to a transactional usage record associated with the swipe card; and
   initiating swipe mismatch management when the swipe count exceeds a threshold value associated with the transactional usage record, the threshold value representing a difference between the swipe count and the transaction usage record, wherein the threshold value is a non-zero value.

7. The method of claim 6, wherein the threshold value is a range of values associated with a number of transactions associated with the transactional usage record.

8. The method of claim 6, wherein the threshold value is calculated by at least one of adding and subtracting a predetermined value to a number of transactions associated with the transactional usage record.

9. The method of claim 6, further comprising:
   receiving swipe descriptive information associated with at least one transactional use of said card, the swipe descriptive information identifying information associated with the at least one transactional use of the card that is distinct from a swipe count.

10. The method of claim 9, wherein the descriptive transactional information includes a merchant identifier.

11. A system for monitoring swipes of a swipe card, the system comprising:
    a first swipe terminal for reading a swipe count on a swipe card, wherein the swipe count indicates the number of times the swipe card has been swiped by at least one of the first swipe terminal and a second swipe terminal for transactional usage of the swipe card, the swipe count being distinct from a number of authorized transactional uses of the card;
    a host for monitoring swipes, the host having access to account transaction records for correlation to the swipe count; and
    a network for communicating information between the swipe terminal and the host, the information including the swipe count, the host initiating swipe mismatch management in response to the swipe count exceeding a threshold value associated with the account transaction records, the threshold value representing a difference between the swipe count and the number of authorized transactional uses indicated in the account transaction records, wherein the threshold value is greater than zero.

12. The system for monitoring swipes according to claim 11, further comprising a swipe card including a swipe counter for accessibly storing a swipe count.

13. The system for monitoring swipes according to claim 11, wherein the swipe counter includes a piezo-electric element.

14. The system for monitoring swipes according to claim 11, wherein the swipe counter includes a capacitive element for storing pulses of energy generated when the magnetic strip is swiped.

15. The system for monitoring swipes according to claim 11, wherein the swipe counter includes a micro-electromechanical system for recording select physical movement of the card.

16. The system for monitoring swipes according to claim 12, further comprising:
    a swipe analyzer for detecting and accessibly storing descriptive transactional information associated with at least one transactional usage of the swipe card, wherein the swipe analyzer is operatively coupled to the swipe card.

17. The system for monitoring swipes according to claim 11, wherein the swipe counter includes a sensor for detecting at least one of heat, light or vibration associated with the swiping of the magnetic strip.

18. The system for monitoring swipes according to claim 16, wherein the descriptive transactional information includes a merchant identifier.

* * * * *